June 4, 1940.   E. J. PANISH   2,203,233
VALVE OPERATING MECHANISM
Filed July 2, 1937   2 Sheets—Sheet 1

INVENTOR
ERWIN J. PANISH,
BY
Arthur Middleton
ATTORNEY.

June 4, 1940.   E. J. PANISH   2,203,233
VALVE OPERATING MECHANISM
Filed July 2, 1937   2 Sheets-Sheet 2

INVENTOR
ERWIN J. PANISH,
BY
Arthur Middleton
ATTORNEY.

Patented June 4, 1940

2,203,233

UNITED STATES PATENT OFFICE 2,203,233

VALVE OPERATING MECHANISM

Erwin J. Panish, Bridgeport, Conn.

Application July 2, 1937, Serial No. 151,594

2 Claims. (Cl. 172—239)

This invention relates to limit-switch-controlled power-drive mechanism, and more particularly to a power-drive for effecting the automatic opening and closing respectively of valves or the like.

In a known motor equipped power-drive mechanism for valves the extreme open and closed positions of the valve are determined by and correspond to the timing function of a geared limit switch device. Whereas, usually no particular problem is involved in using some suitable switch means for terminating the valve opening movement of the valve spindle at a desired point, there is encountered a difficulty as regards the closing movement in that the valve seating pressure should not exceed a normally permissible maximum value in order to avoid overstraining or breakage due to seating or due to obstruction of parts or jamming, say, of a valve disc or gate in its seat. Therefore it is a known practice in the design of such power-drives to provide for a pressure responsive device or yielding safety element in conjunction with, or as part of, the driving gear train, and which functions to cut off the motor power when the amount of valve seating pressure predetermined and considered permissible has been reached.

Such safety cut-off control is conventionally realized by way of pressure responsive axial displacement of a driving worm shaft constituting an element in the gear train that transmits the power from the motor at the driving end, to the valve spindle at the driven end of the gear train. Consequently, responsive to the amount of such pressure responsive axial shaft displacement a suitable switch may be actuated by the axial movement to cut the power when theoretically a certain valve seating pressure has been reached.

However, even with such pressure responsive control for the power cut-off switch, it nevertheless appears that a predetermined seating pressure cannot be accurately obtained as a result of a predetermined amount of yielding shaft displacement, and this is due to a rather incalculable over-running tendency or momentum of the motor armature effective after the power is cut and the valve has found its seat. While such inherent momentum will vary according to the variable resistance of the valve to closing, its effect may be sufficient, as the valve disc finds its seat, to set up valve seating pressure somewhat in excess of that predetermined.

In view of this over-running effect of the motor armature at the point of valve seating, it has also been proposed to have suitable limit switch actuating members so timed with the valve closing movement of the valve spindle or its driving elements respectively, that an electro-magnetically controlled quick action clutch device is caused in effect to release the valve spindle from the power-drive proper at the point of valve seating. Again, however, this is no guarantee that the power release will take place exactly at the valve seating point or else under certain desired valve seating pressure conditions, inasmuch as both the timed relationship between final valve closing position and the de-clutching operation, depend solely upon predetermined and adjustable space relationships which exist incident to the controlled movements of the respective limit switch actuating elements, and which continually vary in actual working condition of the valve, due to unequal thermal expansion or foreign matter changing the closing point in relation to the timing of the limit switch.

The present invention therefore contemplates curing the defects thus inherent to the above mentioned two diverse methods for controlling the valve seating position or valve seating pressure respectively, and a main object is to devise a valve closing control means whereby true and substantially calculable, and within extremely close limits pre-determinable valve seating pressures of a desired order are established at once after the valve has closed and the power has been cut, no matter how much the valve closing point may vary under actual working conditions.

To obtain such type of control the invention proposes to have a de-clutching device influenced directly in proportion to and from the reaction due to seating or arresting of the valve disc; that is to say, to have the de-clutching device actuated through a seating pressure responsive device which will cause the de-clutching device to function when the valve seating pressure has reached a predetermined value, and in a manner to positively cut out at a precise point any injurious or undesirable continued driving effects from any source ahead of the declutching elements.

Consequently it is a feature of the invention and productive of a new technical result, to couple the function of the aforementioned axially displaceable wormshaft with the function of the aforementioned electro-magnetically operated clutch device, in such a manner that through their coaction the desired cut-off effects are obtained, and predetermined valve seating pressures are held within extremely close limits, never heretofore possible.

In a preferred embodiment both the power cut-off as well as the electro-magnetic declutching device are controlled from an electric switch device, the function of which stands under the substantially direct influence of the amount of valve seating pressure expressed in terms of yielding wormshaft displacement.

Still more specifically, a switch operable to control the electro-magnetic holding power of the clutch device, is adjustable relative to the axially movable wormshaft so as to make it possible to vary its responsiveness in terms of valve seating pressure desired to be established. Also the switch device may be adjustable in itself with regard to relative time delay as between the switching off of the motor power and that of the electro-magnetic declutching device.

The invention possesses other objects and features of advantage, some of which with the foregoing will be set forth in the following description. In following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Figure 1:
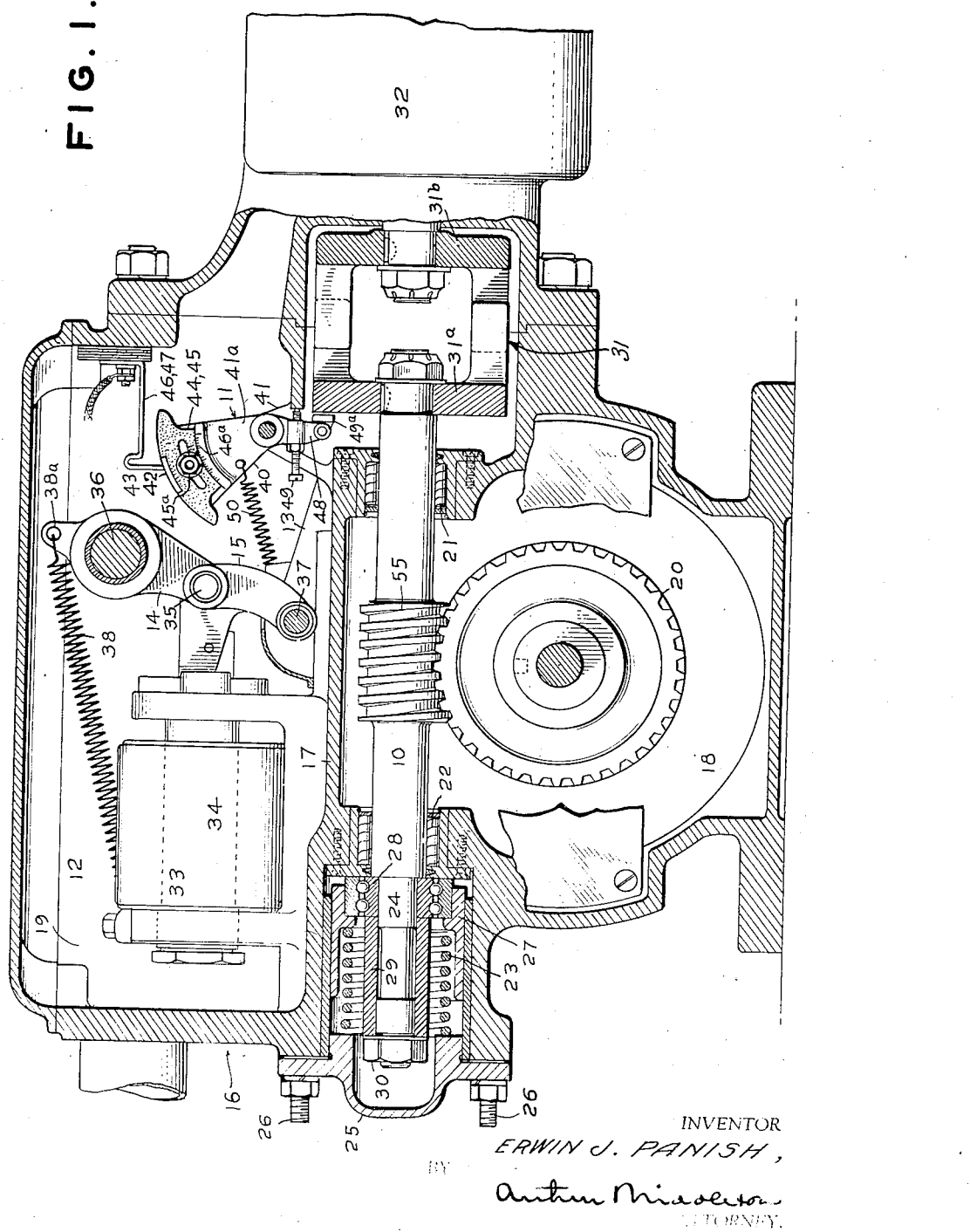
Fig. 1 is a sectional view of an electro-mechanically operated mechanism as for valves.

By way of example the features of this invention are shown to be embodied in an operating mechanism for valves substantially as disclosed in the patent to Dean, No. 1,708,941, and this mechanism is herein only shown to the extent necessary to illustrate the features of improvement according to this invention.

In adapting the patented design to the improvements a driving wormshaft therein has been made axially shiftable in response to driving reaction and is herein indicated by the numeral 10, and an electric switch or contact member 11 has been added, which is actuable by the axial shifting movement of the wormshaft to cut off power supplied by the driving motor. Controlled by the same switch member is also an electro-magnetically operated gear-disconnecting or declutching device also disclosed in the patented construction and comprising broadly a solenoid device 12, a latch-member 13, toggle links 14 and 15 through which the latch-member is controlled from the solenoid device. That portion of the drive gear mechanism, which cooperates with, that is to say, is engaged or dis-engaged by the latch member 13 is not shown herein, but can be assumed to be substantially the same as disclosed in the above-mentioned Dean patent, and this gear mechanism may be the one that activates a screw spindle for opening and closing a valve or the like.

More in particular the valve operating mechanism as far as herein shown (Fig. 1) for the purpose of explaining and illustrating the present improvements, comprises a casing 16 which is divided by a partition 17 into a lower section 18 to house the drive gear, and an upper section 19 which houses electro-mechanical limit control and safety mechanism for the automatic opening and closing of the valve.

In the lower section 18 of the casing the parts of the drive gear mechanism shown include a worm wheel 20 meshing with the aforementioned wormshaft 10 mounted in bearings 21 and 22 in the casing. At its free end portion the wormshaft is held resiliently against axial driving pressure by a compression coil spring 23 which surrounds an extension 24 of the wormshaft. The spring 23 is confined between a cover 25 bolted onto the casing as at 26, and a cup member 27 shown to fit over the outer stationary race of a ball bearing 28 of the wormshaft. The inner rotary race of the ball bearing is shown to be held in place by way of a sleeve 29 and a nut 30 screwed upon the extreme threaded outer end portion of the wormshaft. At the opposite end of the wormshaft is provided a clutch 31, including a driven clutch portion 31a and a driving clutch portion 31b to provide operative driving connection between the wormshaft and a motor 32, permitting however of simultaneous axial movement of the wormshaft as against the axial pressure of the coil spring 23 and in response to certain excess driving force.

In the upper section 19 of the casing is mounted the solenoid device 12 comprising a core 33 movable within an energizable coil 34. The core 33 is connected with the toggle links 14 and 15 by means of pivot 35. The upper toggle link 14 has a pivotal mounting 36 upon the casing, the lower toggle link 15 has a pivot connection 37 with the latch member 13. A spring 38 has one end anchored to the casing and the other end attached to an eye 38a of the upper toggle link 14 in a manner that tends to break the toggle connection unless restrained by the core 33 of the solenoid device 12 when the same is energized. In other words, the solenoid device when energized will keep the latch member engaged in a manner that the drive gear between the motor and the valve spindle or the like will be operative, whereas de-energizing the solenoid device will permit the spring 38 to break the toggle connection and to withdraw the latch 13 thereby causing a disconnection or interruption of the operative train of the drive gear.

Furthermore there is mounted within the upper section 19 of the casing the electric switch or contact member 11 which consists of a rocker arm 40 pivotally mounted in bearing lugs 41 rising from the partition 17. The rocker arm 40 has an upwardly extending sector shaped portion 41a which carries a pair of insulated contact members 42 and 43, each contact member being unitary with a mounting 44 and 45 respectively, the mountings being adjustable upon the rocker arm as indicated by bolt and nut connection 45a. There is provided a gradation 46a for each mounting to indicate the degree of adjustment.

Cooperatively associated with each contact mounting 44 and 45 is a pair of contact blades 46 and 47 respectively which are designed to be closed or bridged by the contact members to keep certain respective circuits closed, and which are designed so that the opening of the contacts will open the motor circuit and the energizer circuit for the solenoid device 12 respectively. According to the relative adjustment of the mountings 44 and 45 upon the switch member 11 the motor circuit will be cut prior to or simultaneously with the solenoid energizer circuit, and in a manner and for a purpose hereinafter to be explained. The rocker arm 40 furthermore has a downwardly extending portion 48 adapted to reach into cooperative engagement with the driven clutch portion 31a and provided with a set screw 49 adapted to rest against an adjacent portion of the casing, and further provided with a pivoted contact member 49a adapted to reach into sliding contact engagement with the clutch portion 31a. A spring 50 between the casing and the rocker arm 40 is designed to function in such a manner that an axial shifting of the wormshaft in response to an excess of driving pressure will swing the rocker arm into a position or positions tantamount to breaking the motor circuit and the solenoid circuit in succession or together.

The operation of a valve actuating mechanism just described is as follows:

Normally, that is to say, with wormshaft 10 in normal or undisplaced position, the rocker arm 40 is in a position where the contact blades 46 and 47 are bridged by the contacts 42 and 43 and the contacts thus closed. With the switch member 40 thus conditioned, and certain other switches open, the motor is assumed to be at rest and the solenoid device 12 as de-energized. Then, assuming the valve to be in open position, in order to close it the motor is started by closing a motor switch, and the solenoid is energized by closing a solenoid switch both switches being actuated from the same, namely, the valve closing push button. This means that upon pressing the valve closing push button the motor starts closing the valve while the drive gear mechanism is held operative because of the energized solenoid device 12 holding the latch member 13 engaged in gear connecting position.

When the valve reaches its seat, continued motor power will manifest itself in excess driving pressure, causing axial displacement of the wormshaft 10 as against the pressure of the spring 23. Such axial displacement will cause rocking of the switch member 11 and thereby breaking of the motor circuit through the contact blades 46 to stop the motor. However, even after the motor circuit is broken, the momentum of the motor armature has an effect of its own which it manifests in the way of additional driving force transmitted through the drive gear mechanism and resulting in an incalculable and perhaps undesirable seating pressure exerted upon the valve seat. In other words, the valve seating pressure increases until the momentum is spent unless the transmission of such additional pressure through the gear mechanism is checked. Accordingly, in order to check such excess effects the other contactor 43 on the switch member 11 may be so adjusted relative to the first contactor 42 that it will break the solenoid energizing circuit either simultaneously with the motor power cut off or else subsequent thereto. Cutting the solenoid energizing circuit causes the core member 33 to be released from the magnetic holding power of the solenoid while permitting the spring 38 to break the bracing effect of the toggle links 14 and 15 and thus causing a quick action disengagement of the latch member 13 and a disengagement or de-clutching of the drive gear mechanism thereby rendering at once impossible any undesired or continued increase in seating pressure. Normally the solenoid cutoff will be arranged to be subsequent to the motor power cutoff and will be so timed with respect thereto that the amount of armature momentum permitted to become effective in terms of added seating pressure will not exceed a predetermined or else calculable maximum. However, if the value of the full armature momentum does not exceed a maximum in terms of permissible valve seating pressure, no gear disconnection will and need be effected.

In opening the valve an "opening push button" will start the motor going in the reverse direction, and the same push button will also re-energize the solenoid device 12 so as to effect re-engagement of the latch member 13 in order to restore operative connection of the drive gear mechanism. The motor then operates until an opening limit is reached at which the motor may be stopped by any ordinary limit switch device.

It will be clear from the foregoing that the safeguarding means for preventing undesirably high or uncontrolled valve seating pressures, are also effective when an obstruction is met in the valve during the valve closing operation.

Figure 2:
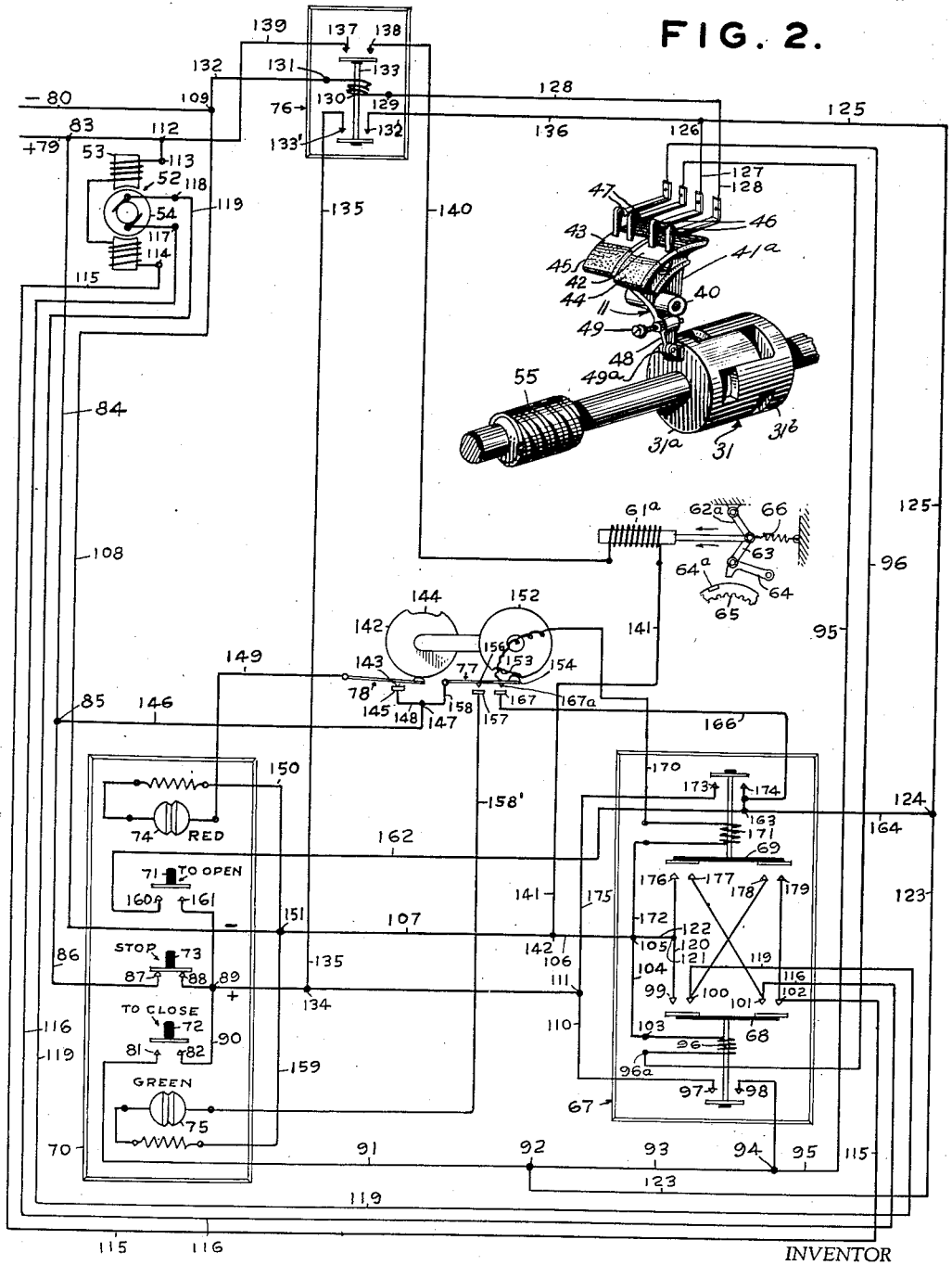
Fig. 2 is an electrical wiring diagram for operating the mechanism according to Fig. 1.

The functioning of the mechanism will now be more specifically explained and described on the basis of the electrical wiring diagram of Fig. 2 with its switches, solenoids, and other adjuncts.

The operation according to the electrical wiring diagram of Fig. 2 is as follows:

In this diagram the motor is indicated by the numeral 52 and includes the field windings 53 and the armature 54. Numbered the same as in Fig. 1 there are shown the axially shiftable wormshaft at 55 along with the clutch portions numbered 31a and 31b and the switch member 11 with adjustable contact members 44, 45, and the contact blades 46 and 47, all corresponding to similar parts shown in the mechanism of Fig. 1. The solenoid device to control the connection or disconnection of the drive gear is here indicated by the numeral 61a, and the toggle links are indicated at 62a and 63, the latch at 64, the associated drive gear portion at 65, and at 66 a suitable spring for the toggle links.

A power switch for the motor is indicated at 67 with solenoid controlled contact members 68 and 69 for operating the motor in valve opening and in valve closing direction. A push button station with pilot lights is shown at 70 as having a valve opening push button 71, a valve closing push button 72, a stop button 73, a red pilot light 74, and a green pilot light 75. Another solenoid controlled switch 76 is in circuit with the solenoid device previously indicated by the numeral 61a with the latch member 64. There are furthermore provided and mechanically coupled with one another and with the valve operating mechanism a plain limit switch 77 to determine the end of the valve opening movement and a pilot light switch 78.

Fig. 2 shows the wiring diagram in a condition which corresponds to the open position of the valve with gear disconnected as will be seen by the position of the latch member 64. The solenoid device 61a is de-energized, and all switches and contacts are open or de-energized respectively except for the red pilot light switch 78 which is closed because the red light indicates the open position of the valve, and also except for the contact blades 61 and 62, which were automatically closed at the start of the opening operation.

A power supply is indicated by way of the plus- and minus-poles 79 and 80 respectively of respective positive and negative trunk lines. In order to start the valve closing operation it is necessary to press the closing push button 72 to close contacts 81 and 82 associated therewith. This sets up a momentary circuit from point 83 through conductor section 84 over junction point 85, through section 86, contact points 87 and 88 of the stop button 73, junction point 89, then through branch 90 over the contact points 81 and 82 of the closing button 72, on through conductor section 91, junction point 92, conductor section 93, point 94, and by way of conductor section 95 over the contact blades 61 and back through conductor section 96 to point 96a in the power switch 67.

At this point the valve closing circuit set up by push button 72 is effective in that it energizes the solenoid windings 96 or holding magnet of the power switch contact member 68 causing the same electro-magnetically to close contact points 97 and 98 as well as contact points 99, 100 and 101, 102. From solenoid windings 96 the circuit continues over terminal point 103 and conductor section 104 to point 105 of the negative trunk line which includes conductor sections 106, 107, 108 terminating in point 109.

The closing of the contact points 97 and 98 establishes a holding circuit for the contact member 68, although meanwhile the push button 72 has been released, in that now the push button 72 is by-passed by a branch extending from point 111, over conductor 110, contact points 97, 98, to point 94.

The closing of the contact points 99 and 100, and 101 and 102, starts the motor by supplying current to the armature 54 and the field windings 53 respectively in series. This will be clear from tracing the respective conductors between the supply lines, the power switch, and the motor. From the positive pole of the supply line the circuit starts at the point 112, continues over motor terminal 113, field windings 53 to motor terminal 114, on through conductor section 115, over contact points 102 and 101, conductor section 116 to motor terminal 117, through the armature 54, motor terminal 118, conductor section 119, over points 100 and 99 in the power switch, through conductor section 120 and point 121 to join the negative pole by way of conductor 122 and point 105.

The operation of the "closing push button" however has a double function in that it also sets up a circuit to energize the solenoid device 61a to cause engagement of the latch member 64 to restore operative connection of the drive gear. That is to say, push button 72 will also close a circuit from point 92 on the positive side of the circuit through a conductor section 123, past junction point 124, conductors 125, point 126, conductor 127, contact blades 62, conductor 128, to a terminal point 129 of the switch 76 and through solenoid windings 130, terminal point 131, and conductor 132, to the negative pole 109. This circuit energizes the solenoid coils 130 causing a contact member 133 of the switch 76 to close contacts 132 and 133' to establish a magnet holding circuit for the contact member 133 after the momentary push button circuit has ceased to exist, this magnet holding circuit being readily traced from point 134 on the positive trunk line, through conductor 135, contact points 133' and 132, conductor 136, point 126, conductor 127, contact blades 62, conductor 128, and through the solenoid coils 130 to the negative pole 109.

The switch member 133 then also closes contacts 137 and 138 thereby establishing an energizing circuit from the positive trunk line through conductors 139 and 140, the coils of the solenoid device 61a, and the conductor 141 terminating at point 142 on the negative trunk line.

With the solenoid device 61a thus energized, the core of the solenoid forces the toggle links 62a and 63 into their latch bracing position, and the latch 64 will drop into the recess 64a to establish the operative connection of the driving gear.

With the drive gear connection thus effective, the motor now operates to close the valve and after reaching the valve seat the resistance thus set up in the drive gear will cause a longitudinal displacement of the wormshaft 55 which rocks the contact member 40 until the contact blades 41 slide off the contact 43, thus breaking the circuit that energizes the solenoid 96 of the switch member 68. Accordingly, the switch member 68 drops out, cutting the motor circuit. However, the armature momentum has potential energy which tends to increase the valve seating pressure unless the mechanical power transmission for it is broken.

Therefore, in order to effect a quick action disconnection of the driving gear, the contact 42 is so adjusted that a certain predeterminable amount of excess valve seating pressure expressed in terms of displacement of the wormshaft 55, will break the contact between the contact blades 46 and the contact 42, thus breaking the energizing circuit for the solenoid windings 130, and opening the switch 76.

This at once breaks the circuit that energizes the solenoid device 61a, releasing the core thereof which permits the spring 66 to break the bracing effect of the toggle links 62 and 63 and thereby to disengage the latch 64 from the drive gear, the result being that the drive gear connection is broken precisely at a predetermined degree of valve seating pressure, and any surplus armature momentum is then left free to exhaust itself without reaching the valve spindle or the like.

It will be remembered that while the operating mechanism was conditioned for the valve to be wide open, the red pilot light was lit to indicate such a condition, inasmuch as the switch 76 was closed. This red light will remain lit during the valve closing operation, that is as long as a control disc 142 of the switch 76 and driven from the valve actuating mechanism has not yet released a movable contact member 143 of the switch 76. As soon as this happens, that is when a notch 144 of the disc 142 permits the contact member 143 to separate from a companion contact member 145, say, at the end of the valve closing operation, the red light 74 will drop out.

The circuit which in this way controls the red pilot light leads from point 85 on the positive trunk line, over conductor 146 and point 147, conductor 148, contact members 145 and 143, conductor 149, to red light 74, and on through conductor 150 to point 151 on the negative trunk line.

In the meantime, that is during the valve closing operation, the green pilot light 75 has also been lit since a control disc 152 of the switch 77 has also rotated in unison with the other control disc 142 and has displaced from its notch 153 a movable contact member 154 of the switch 77. Consequently, the control disc 152 is so arranged that at the end of the valve closing operation the green light only, will remain lit. The circuit which in this way controls the green pilot light leads from point 85 on the positive trunk line through conductor 146, over point 147 and a conductor 156, over contact points 156 and 157, through conductor 158', to green pilot light 75, and conductor 159 to point 151 on the negative trunk line.

The valve opening operation and its automatic limitation are simple and trivial, inasmuch as no special safety measures are required beyond providing a suitable limit switch for the motor power.

Accordingly, pressure upon the valve closing push button 71 will initiate the valve closing movement by closing push button contacts 160 and 161. This causes re-energizing the solenoid device 61a in order to restore operative connection of the drive gear mechanism as previously described, and the circuit thus established passes from point 89 on the positive trunk line over the push button contacts 161 and 160, through a conductor 162, point 163, conductor 164, point 124, and on through conductors 125, point 126, and conductor 127, by way of the contact blades 62 and conductor 128 to energize and actuate the magnetic switch 76 in a manner previously described, thus eventually energizing the solenoid device 61a to effect drive gear engagement.

Along with the restoration of the drive gear connection through solenoid device 61a, the motor must be started. At this time, that is after the preceding valve closing operation, the contact member 77, controlled by disc 152, must be assumed to be in closed position, that is with contact points 156 and 157 on the one hand, and points 167 and 167a on the other hand closed. The green light 75 at this time has dropped out with contact points 143 and 145 assumed to be open. Under this set of conditions, if the valve opening push button 71 is operated to close the contact points 160 and 161, a motor starting circuit is established from point 89 on the positive trunk line, through contact points 161, 160, conductor 162, point 163, conductor 166, through the closed contact points 167 and 167a, conductor 170, solenoid windings 171 for the switch member 69, and through conductor 172 to point 105 on the negative trunk line. This momentary current causes the closing of the switch member 69, that is to say the closing of the contact points 173 and 174, thereby setting up a solenoid holding circuit as from point 111 on the positive trunk line, through conductor 175, contact points 173 and 174, conductor 166, contact points 167 and 167a, conductor 170, solenoid windings 171, and conductor 172, to point 105, on the negative trunk line. At the same time of course the motor switch member 69 closes contact points 176 and 177, and 178 and 179 to start the motor 52 going in a direction opposite to that of the valve closing operation.

The motor then continues until the disc 152 driven by the valve actuating mechanism has reached a position where the contact member 77 again will have found the recess 153 of the disc 152, thus separating the contact points 156 and 157, and 167 and 167a, stopping the motor by opening the motor circuit in releasing the switch member 69 from the solenoid effect of the windings 171. At the same time, due to the opening of the contact points 156 and 157, the green pilot light 75 will drop out, while the red pilot light 74 will have been re-lit, due to the closing of contacts 143 and 145 during the opening of the valve. It will be clear that the red light alone indicates the open position of the valve, whereas green indicates the closed position, although during the valve opening or valve closing operation, both lights will be lit.

A stop button 73 in the positive trunk line permits to stop the valve opening or closing operation at any desired phase.

What I claim is:

1. In combination with a valve construction having an actuating spindle for the valve closure member therein and which spindle is operable to open and close the valve; automatically controlled power driven mechanism for the valve spindle, which mechanism comprises a motor, a train of power transmitting elements between the motor and the spindle, one of which elements is resiliently displaceable under the influence of substantially predeterminable excess driving reaction, means controlled from said displaceable element and by a predetermined amount of displacement thereof, to cause the cutting of the power supplied to the motor, and further comprising controllable disconnecting or declutching means operable for positively and instantaneously terminating the transmission of power driving effects through said train of elements, a primary actuating device to render operative or inoperative respectively said declutching means, a secondary actuating device controlled from said displaceable element and responsive to displacement effective thereon, in a manner to cause said primary actuating device to effect mechanical declutching in response to a predetermined increment of displacement of said displaceable element due to a corresponding increment of excess driving reaction, whereby there are instantaneously shut off or rendered impotent any power drive effects from the motor during the closing movement of said valve spindle, and automatic electric switch means for limiting the opening movement of said spindle.

2. In combination with a valve construction having an actuating spindle for the valve closure member therein and which spindle is operable to open and close the valve; automatic switch controlled power driven mechanism for the valve spindle, which mechanism comprises a motor, a train of power transmitting elements between the motor and the spindle, one of which elements is resiliently displaceable under the influence of substantially predeterminable excess driving reaction, means controlled from said displaceable element and by a predetermined amount of displacement thereof, to cause the cutting of the power supplied to the motor, and further comprises controllable disconnecting or declutching means operable for positively and instantaneously terminating the transmission of power driving effects through said power transmitting elements, an electrically operable control device to render operative or inoperative respectively said declutching means, an electric limit switch device controlled from said displaceable element and responsive to displacement effective thereon, in a manner to cause said electrically operated control device to effect mechanical declutching in response to a predetermined increment of displacement of said displaceable element due to a corresponding increment of excess driving reaction, whereby there are instantaneously shut off or rendered impotent any power drive effects from the motor during the closing movement of said valve spindle, and other automatic electric switch means for limiting the opening movement of said spindle.

ERWIN J. PANISH.